US007288498B1

(12) United States Patent
Levy

(10) Patent No.: US 7,288,498 B1
(45) Date of Patent: Oct. 30, 2007

(54) TRANSITION METAL OXIDE-ALUMINOSILICATE PURIFICATION MEDIA

(75) Inventor: Ehud Levy, Roswell, GA (US)

(73) Assignee: Selecto, Inc, Suwanee, GA (US)

( * ) Notice: Subject to any disclaimer, the term of this patent is extended or adjusted under 35 U.S.C. 154(b) by 197 days.

(21) Appl. No.: 10/681,597

(22) Filed: Oct. 8, 2003

Related U.S. Application Data

(63) Continuation-in-part of application No. 10/445,410, filed on May 27, 2003, which is a continuation-in-part of application No. 10/304,898, filed on Nov. 26, 2002, which is a continuation-in-part of application No. 09/854,010, filed on May 11, 2001, now Pat. No. 6,662,956, which is a continuation-in-part of application No. 09/805,758, filed on Mar. 13, 2001, now Pat. No. 6,630,106, and a continuation-in-part of application No. 09/772,542, filed on Jan. 30, 2001, now abandoned, and a continuation-in-part of application No. 09/560,824, filed on Apr. 28, 2000, now abandoned, said application No. 10/681,597 is a continuation-in-part of application No. 08/819,999, filed on Mar. 18, 1997, now Pat. No. 6,241,893.

(51) Int. Cl.
B01J 20/30 (2006.01)
B01J 20/28 (2006.01)
B01J 20/16 (2006.01)
B01D 15/00 (2006.01)
C02F 1/28 (2006.01)
C02F 1/32 (2006.01)

(52) U.S. Cl. .................. 502/5; 502/407; 210/660; 210/663; 210/691

(58) Field of Classification Search .............. 502/5, 502/407; 210/660, 663, 691
See application file for complete search history.

(56) References Cited

U.S. PATENT DOCUMENTS

| | | |
|---|---|---|
| 3,972,694 A | 8/1976 | Head |
| 4,092,245 A | 5/1978 | Franks et al. |
| 4,238,334 A | 12/1980 | Halbfoster |
| 4,257,874 A * | 3/1981 | Bergna .................. 208/111.15 |
| 4,263,266 A | 4/1981 | Michel et al. |
| 4,377,555 A | 3/1983 | Hancock et al. |
| 4,474,853 A | 10/1984 | Watanabe |
| 4,496,528 A | 1/1985 | Bourgogne et al. |
| 4,753,728 A | 6/1988 | VanderBilt et al. |
| 4,767,733 A | 8/1988 | Chester et al. |
| 4,891,949 A | 1/1990 | Caldarola |
| 4,994,249 A | 2/1991 | Verduijn |
| 4,995,975 A | 2/1991 | Jacquot et al. |
| 5,073,272 A | 12/1991 | O'Neil |
| 5,078,978 A | 1/1992 | Tarbet et al. |
| 5,118,655 A | 6/1992 | Pedersen |
| 5,133,871 A | 7/1992 | Levy |
| 5,175,110 A | 12/1992 | Bradshaw et al. |
| 5,178,768 A | 1/1993 | White, Jr. |
| 5,236,680 A | 8/1993 | Nakazawa et al. |
| 5,238,676 A | 8/1993 | Roth et al. |
| 5,254,262 A | 10/1993 | Funkenbusch et al. |
| 5,346,924 A | 9/1994 | Giuffrida |
| 5,401,416 A | 3/1995 | Levy |
| 5,451,444 A | 9/1995 | DeLiso et al. |
| 5,460,734 A | 10/1995 | Birbara et al. |
| 5,503,840 A | 4/1996 | Jacobson et al. |
| 5,538,746 A | 7/1996 | Levy |
| 5,552,058 A | 9/1996 | Fanning |
| 5,562,941 A | 10/1996 | Levy |
| 5,587,089 A | 12/1996 | Vogel et al. |
| 5,612,522 A | 3/1997 | Levy |
| 5,616,243 A | 4/1997 | Levy |
| 5,639,550 A | 6/1997 | Lisenko |
| 5,645,727 A | 7/1997 | Bhave et al. |
| 5,655,212 A | 8/1997 | Sekhar et al. |
| 5,681,475 A | 10/1997 | Lamensdorf et al. |
| 5,737,932 A | 4/1998 | Lee |
| 5,750,026 A | 5/1998 | Gadkaree et al. |
| 5,868,924 A | 2/1999 | Nachtman et al. |
| 5,879,565 A | 3/1999 | Kusmierz et al. |
| 5,915,851 A | 6/1999 | Wattrick et al. |

(Continued)

FOREIGN PATENT DOCUMENTS

EP 0151936 A1 12/1992

(Continued)

OTHER PUBLICATIONS

Hawley, Hawley's Condensed Chemical Dictionary, 14$^{TH}$ Edition, 2002 (definitions for "fumed silica" and "colloid chemistry."*

(Continued)

Primary Examiner—David M Brunsman
(74) Attorney, Agent, or Firm—Buchanan Ingersoll & Rooney PC

(57) ABSTRACT

The invention, in its various embodiments, relates to a medium for purifying fluids, particularly consumable fluids like air and water, by removing organic materials from the fluids by contacting the fluids with a combination of extremely small diameter transition metal oxide and an aluminosilicate having relatively large pores. In addition, contact of the fluids with the purification medium can also significantly reduce the level of microorganisms existing in the fluid, providing another purification benefit.

29 Claims, 23 Drawing Sheets

U.S. PATENT DOCUMENTS

| | | |
|---|---|---|
| 5,961,843 A | 10/1999 | Hayakawa et al. |
| 5,989,420 A | 11/1999 | Sugimoto |
| 6,039,891 A | 3/2000 | Kaufman et al. |
| 6,054,052 A * | 4/2000 | Dhingra et al. ............. 210/656 |
| 6,155,432 A | 12/2000 | Wilson et al. |
| 6,200,483 B1 | 3/2001 | Cutler et al. |
| 6,241,893 B1 | 6/2001 | Levy |
| 6,355,166 B1 | 3/2002 | Amarasinghe et al. |
| 6,630,106 B1 | 10/2003 | Levy |
| 6,662,956 B2 | 12/2003 | Levy |
| 6,733,657 B2 * | 5/2004 | Benazzi et al. ............. 208/110 |
| 2003/0075479 A1* | 4/2003 | Honna et al. ............ 208/111.1 |
| 2003/0173253 A1* | 9/2003 | Liwanga-Ehumbu et al. ..................... 208/111.35 |
| 2003/0173287 A1* | 9/2003 | Johnston et al. ............ 210/496 |

FOREIGN PATENT DOCUMENTS

| | | |
|---|---|---|
| JP | 02290291 A | 11/1990 |
| JP | 11207359 A | 8/1999 |
| WO | WO 9606814 A | 3/1996 |
| WO | WO 01/90280 * | 5/2001 |

OTHER PUBLICATIONS

Hawley's Condensed Chemical Dictionary (Lewis Sr., Richard J., John Wiley & Sons, Inc., 13.sup.th edition, 1204-1205.

* cited by examiner

*EDX SPECTRUM*

TRANSITION METAL OXIDE-ALUMINOSILICATE PURIFICATION MEDIA

This application is a continuation-in-part of U.S. Ser. No. 10/445,410, filed May 27, 2003, which is a continuation-in-part of U.S. Ser. No. 09/854,010, filed May 11, 2001 now U.S. Pat. No. 6,662,956, which is a continuation-in-part of U.S. Ser. No. 09/805,758, filed Mar. 13, 2001 now U.S. Pat. No. 6,630,106, a continuation-in-part of U.S. Ser. No. 09/772,542, filed Jan. 30, 2001 now abandoned, and a continuation-in-part of U.S. Ser. No. 09/560,824, filed Apr. 28, 2000 now abandoned, which is a continuation-in-part of U.S. Ser. No. 08/819,999, filed Mar. 18, 1997, now U.S. Pat. No. 6,241,893, the entire contents of each of which are incorporated herein by reference.

This application is also a continuation-in-part of U.S. Ser. No. 10/304,898, filed Nov. 26, 2002, the entire contents of which is incorporated herein by reference.

BACKGROUND OF THE INVENTION

1. Field of the Invention

The invention relates to a porous media for filtering and purifying fluids, containing a combination of transition nano-metal oxide and aluminosilicate. The combination of these materials removes organic compounds from the fluid, destroys bacteria, algae and virii, and purifies the fluid in the presence or absence of UV or visible light.

2. Description of Related Art

Fluids such as air and water are frequently contaminated by organic compounds and microorganisms, and such contaminated fluids occur widely throughout the world. Such contamination is not limited to undeveloped countries, but can occur and be particularly problematic in drinking water supplies and recirculated air of buildings, airplanes, etc., in developed countries as well. Thousands of water treatment and sewage treatment facilities in the U.S. cannot afford to improve their primary treatment facilities, much less afford to construct secondary treatment facilities. Methods and materials for removing organic contaminants from water that are fast, easy to use, and easily retrofitted to existing systems would be a great benefit for all of these applications.

In addition to large scale fluid purification, there is a significant consumer market in developed countries for air and water filtration and purification devices and materials. Residential and commercial sales of water and air purification devices and media are substantial; consumers use them to attempt to remove organics and microorganisms which municipal water purification processes leave behind, and to remove VOC, pathogens and allergens from the air. Microorganisms, such as bacteria and virii, are very difficult to remove from fluids using the relatively small filters available for home or small scale commercial use.

Different techniques have been used over time to attempt to eliminate these impurities. For example, activated carbon or charcoal has been used for many years to remove volatile organic compounds (VOC) from water and air. However, the process of removal is by adsorption of the organic material onto active sites on or in pores of the carbon, resulting in eventual saturation of the carbon with adsorbed species. Eventually, the carbon will have to be replaced with fresh material, which can be time consuming and expensive. In addition, the total capacity and volumetric flow rate of fluid that activated carbon can purify can be quite limited. Flow rate, in particular, can be limited by the necessity to keep the fluid and the carbon in contact for a sufficient residence time for the adsorption to occur.

Synthetic aluminosilicates useful in water-purification have been disclosed. For example, in U.S. Pat. No. 5,612,522, the entire contents of which are incorporated herein by reference, a method is disclosed for producing a synthetic aluminosilicate that has pore sizes ranging from about 60 Å to about 250 Å by forming a sodium aluminosilicate gel in the presence of ultraviolet radiation. This material is disclosed in the patent as effective in removing dissolved oxygen from water, as well as effective in removing other contaminants, such as dissolved gases. The patent does not specifically disclose removal of organic contaminants or microorganisms from the water.

Metal oxides, and in particular, fumed metal oxides, have been found to be effective water purification materials when included or immobilized in a binder matrix, as disclosed in U.S. Ser. No. 10/445,410, filed May 27, 2003, and in U.S. Ser. No. 09/854,010, filed May 11, 2001, the entire contents of each of which are incorporated herein by reference. Unbound fumed metal oxides have been found to be useful in reducing mineral scale formation and microorganisms levels in water, as disclosed in U.S. Ser. No. 10/304,898, filed Nov. 26, 2002, the entire contents of which are incorporated herein by reference.

The use of titanium dioxide and "zeolites" as "photocatalysts" for the decomposition of phenol is disclosed in "Aqueous Solar Photocatalysis," http://www.saskschools.ca/~pvsd/vsfprojects/solarwaterpure/solarwaterpure/members.home.net/rod.3/main.html. The author states that phenol is adsorbed by the zeolite, and can then be decomposed by UV radiation, in effect regenerating the zeolite. The author is silent with respect to what zeolite is used, except to state that the pores of the zeolite do not exceed 0.5 to 0.6 μm, and that the zeolite has a surface area of 315 m$^2$/g. The author states that the photocatalyst used in his experiments contained this zeolite with about 10% of its surface covered with titanium dioxide. The author speculates that it is the excitation of the titanium dioxide by UV light that causes decomposition of material adsorbed on the zeolite surface.

However, despite these materials and methods for water purification, there remains a need in the art for materials effective in removing organic contaminants and microorganisms from consumable fluids, such as water and air.

SUMMARY OF THE INVENTION

The invention, in its various embodiments, relates to a medium for purifying fluids, particularly consumable fluids like air and water, by removing organic materials from the fluids by contacting the fluids with a combination of extremely small diameter transition metal oxide, metal hydroxide, or combination thereof, and an aluminosilicate having relatively large pores. In addition, contact of the fluids with the purification medium can also significantly reduce the level of microorganisms existing in the fluid, providing another purification benefit. The composition of the invention operates at ambient temperatures, and does not require any special heating or cooling to reduce concentrations of contaminants in fluids.

The transition metal oxide is desirably in the form a nanoparticulate or "fumed" metal oxide, the aluminosilicate desirably has a pore size ranging from about 100 to about 300 Å, more particularly from about 200 to about 300 Å.

The purification medium of the invention can be used in a variety of light conditions, including sunlight, UV radiation, fluorescent, infrared and incandescent light, etc., and can function in darkness. While activity of the medium decreases as it is used, its service life can be extended by exposure of the medium to light after it has been used to remove organic materials from fluids.

The purification medium of the invention provides rapid removal of organic contaminants and microorganisms from fluids, and functions in the absence of appreciable light or UV radiation. The purification medium does not require agitation or stirring to function.

DETAILED DESCRIPTION OF SPECIFIC EMBODIMENTS

Figure 1:
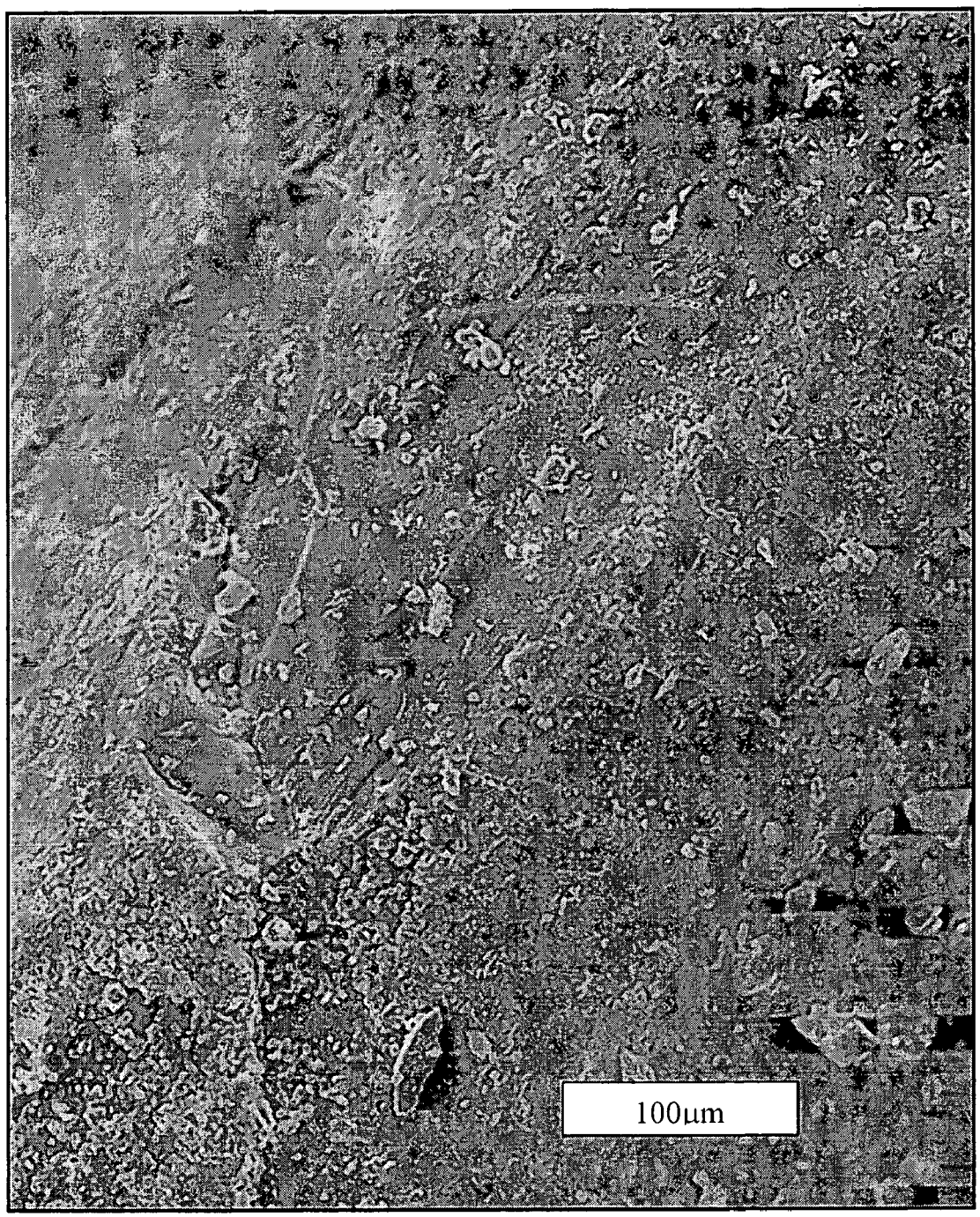
FIG. 1 is a photomicrograph of one embodiment of the composition of the invention, showing a 100 μm scale.
Figure 2:
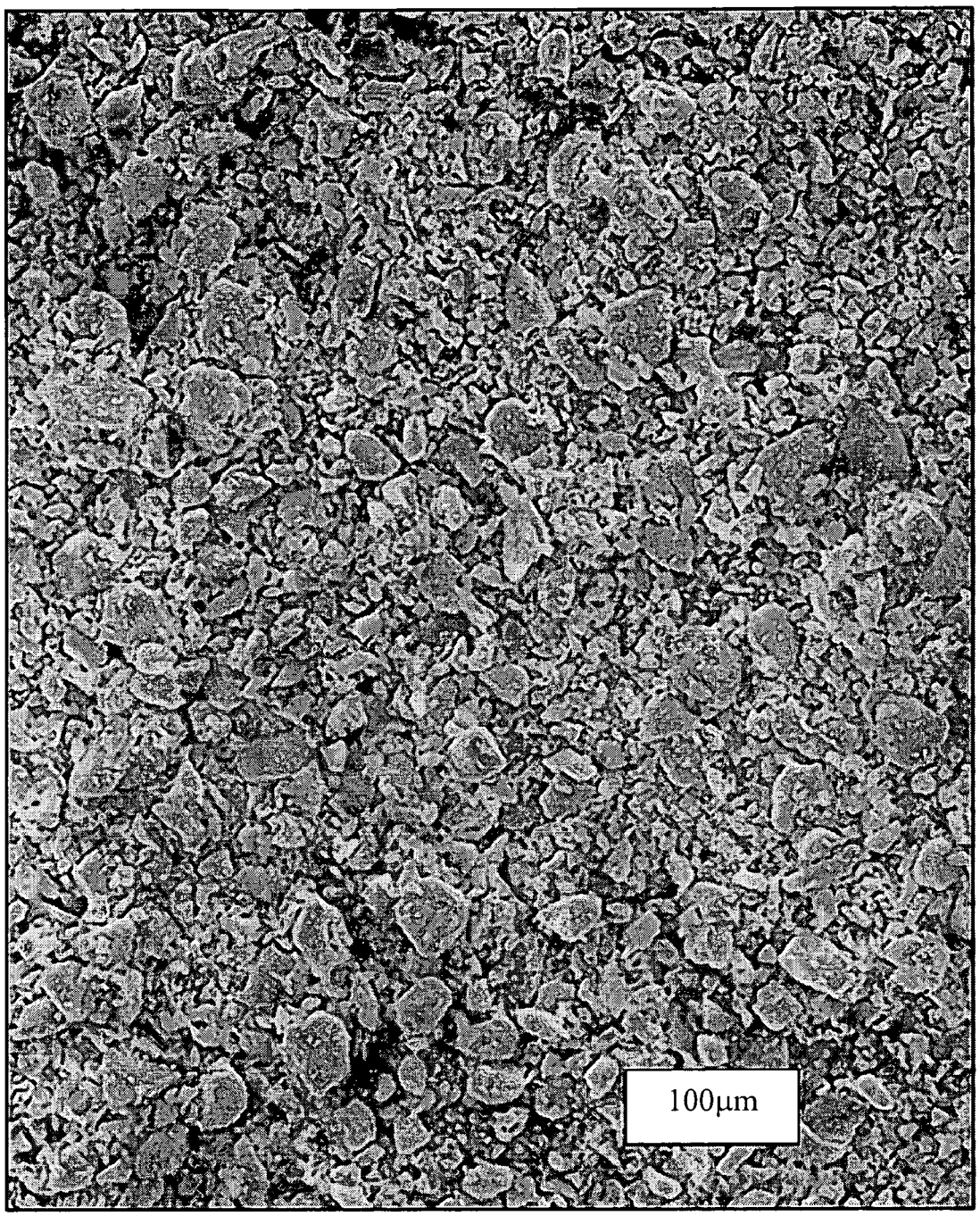
FIG. 2 is a photomicrograph of another embodiment of the composition of the invention, also showing a 100 μm scale.
Figure 3:
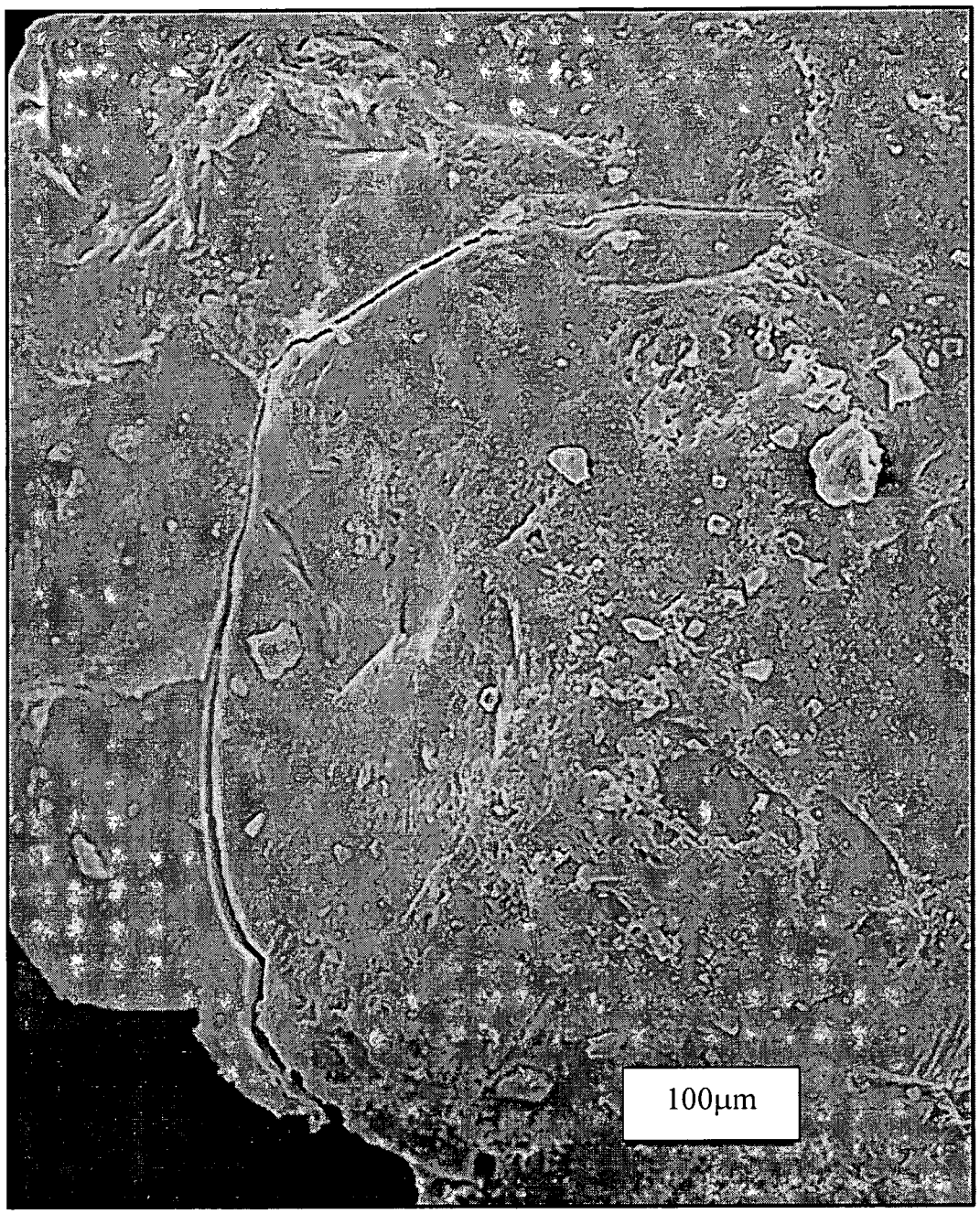
FIG. 3 is a photomicrograph of a comparative composition also showing a 100 μm scale.
Figure 4:
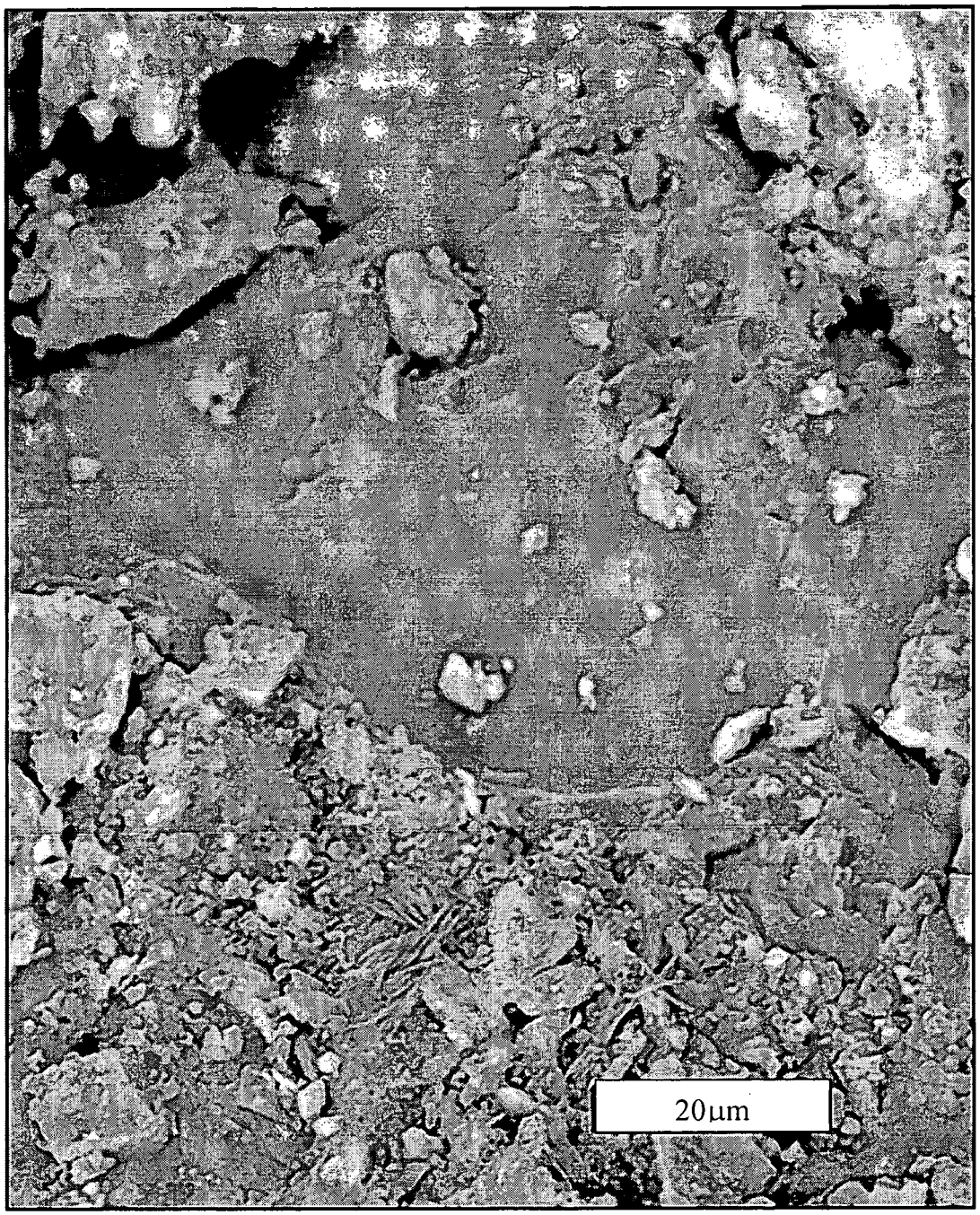
FIG. 4 is a photomicrograph of the embodiment of the composition of the invention shown in FIG. 1, showing a 20 μm scale.
Figure 5:
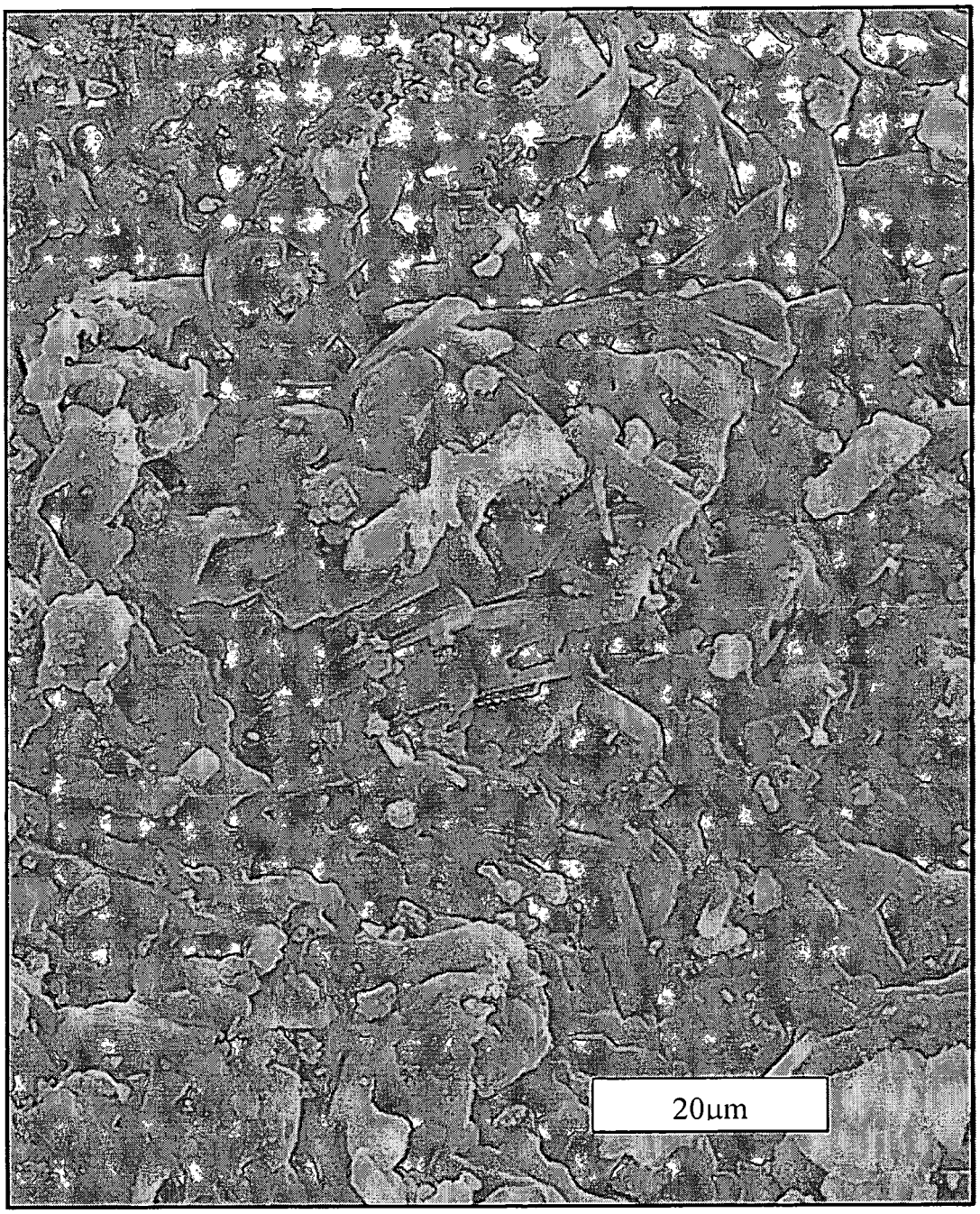
FIG. 5 is a photomicrograph of yet another embodiment of the composition of the invention showing a 20 μm scale.
Figure 6:
FIG. 6 is a photomicrograph of a comparative composition showing a 20 μm scale.
Figure 7:
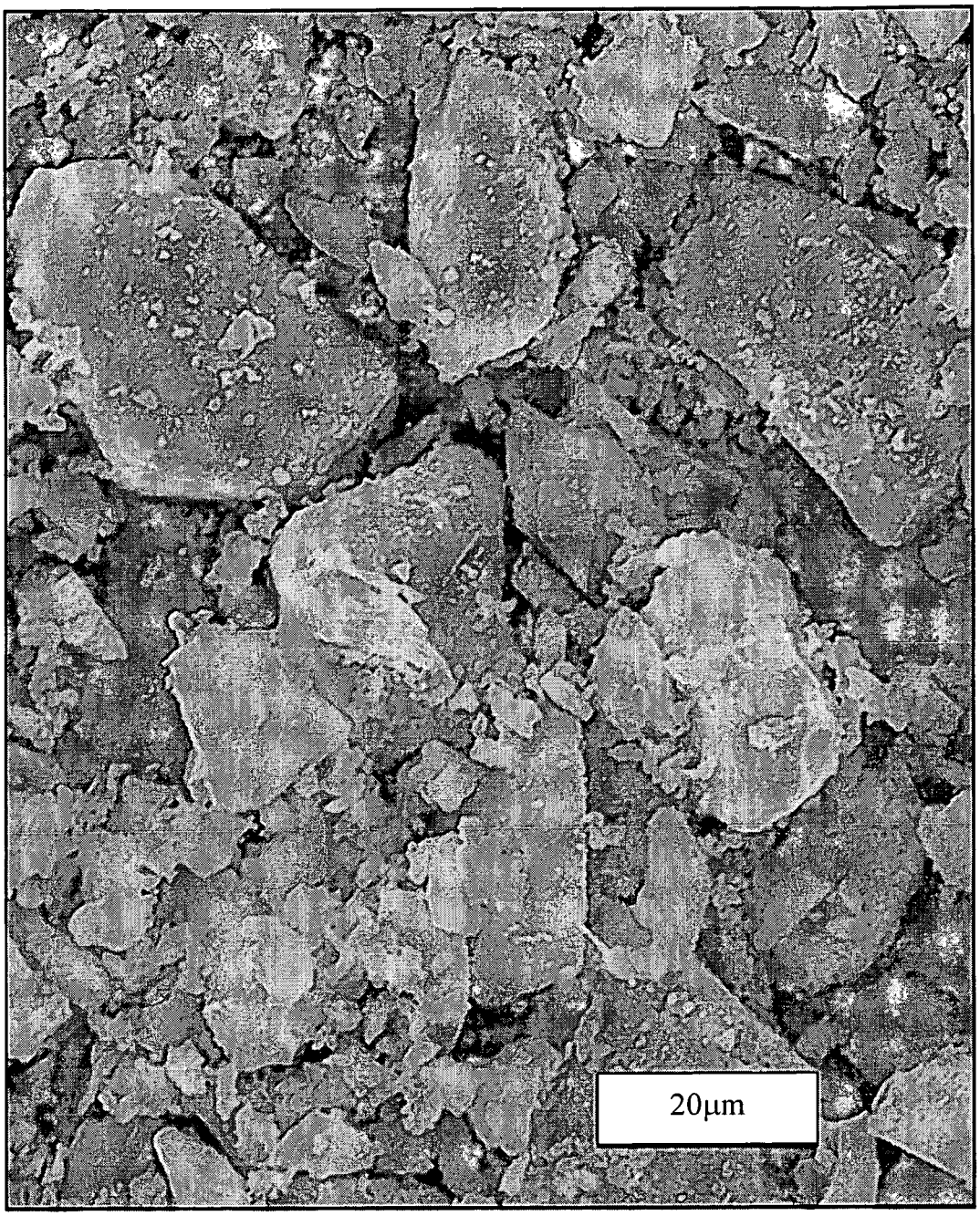
FIG. 7 is a photomicrograph of the embodiment of the composition of the invention shown in FIG. 2, showing a 20 μm scale.
Figure 8:
FIG. 8 is a photomicrograph of yet another embodiment of the composition of the invention showing a 20 μm scale.
Figure 9:
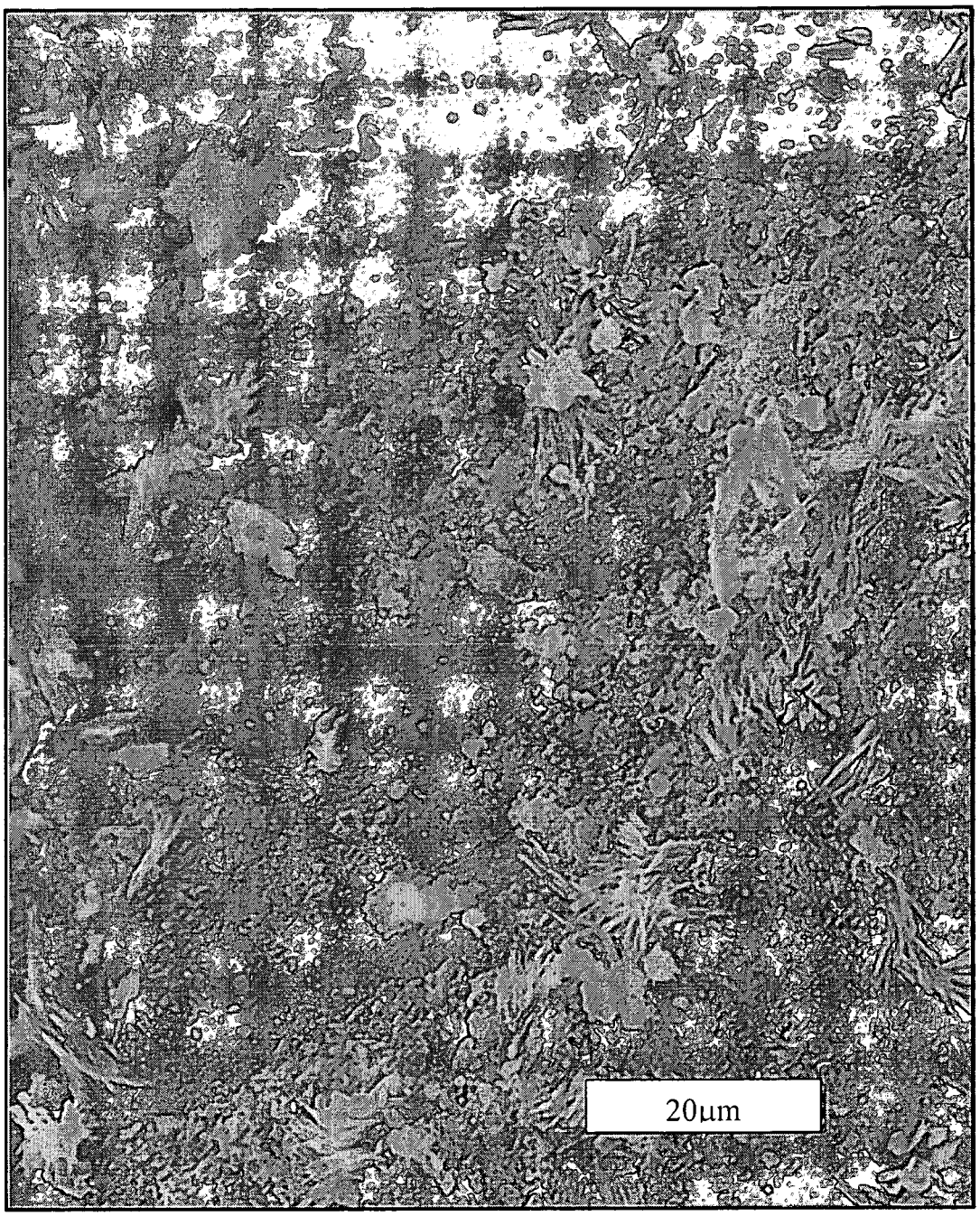
FIG. 9 is a photomicrograph of the embodiment of the composition of the invention shown in FIG. 1, also showing a 20 μm scale.
Figure 10:
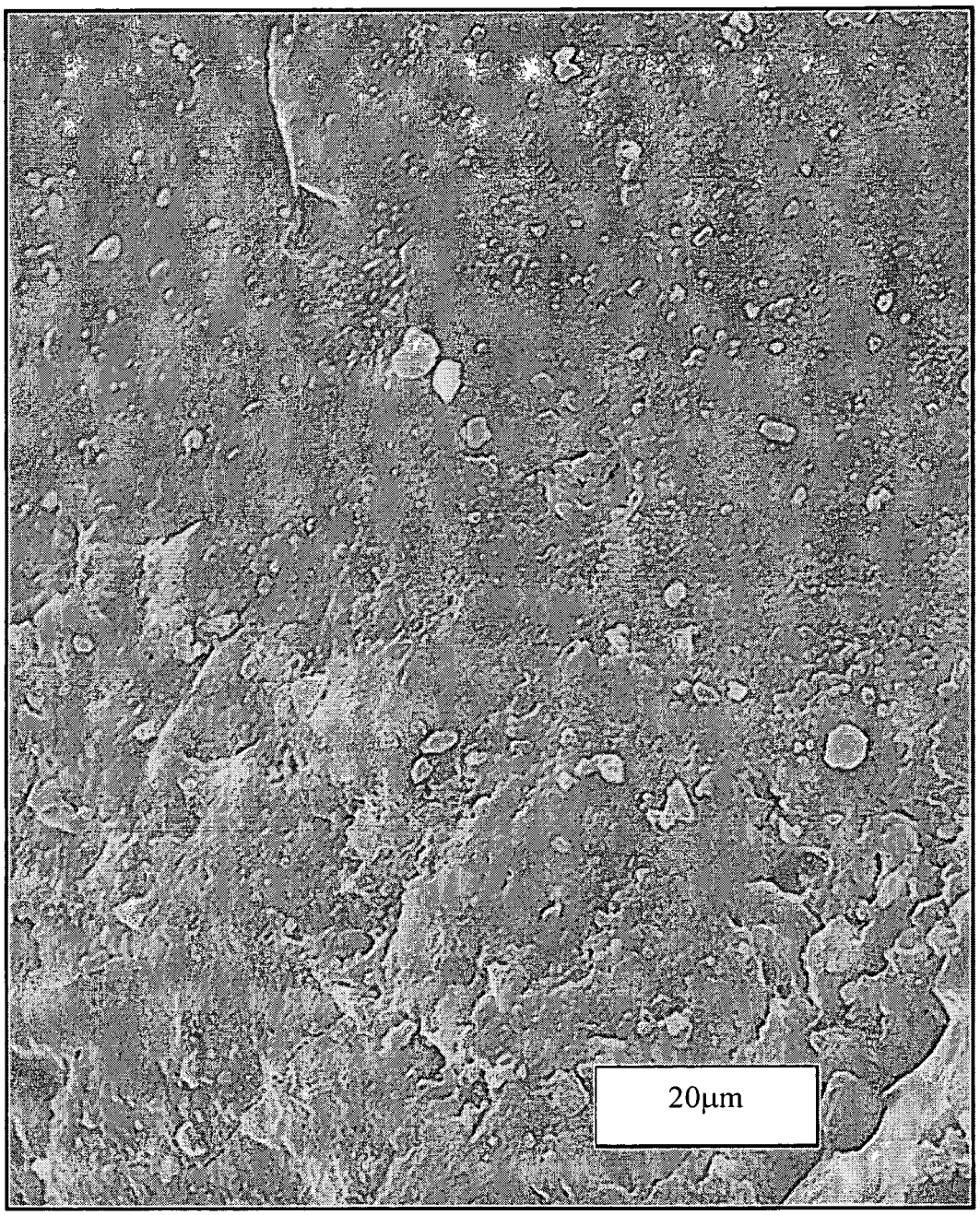
FIG. 10 is a photomicrograph of a comparative composition shown in FIG. 3, also showing a 20 μm scale.
Figure 11:
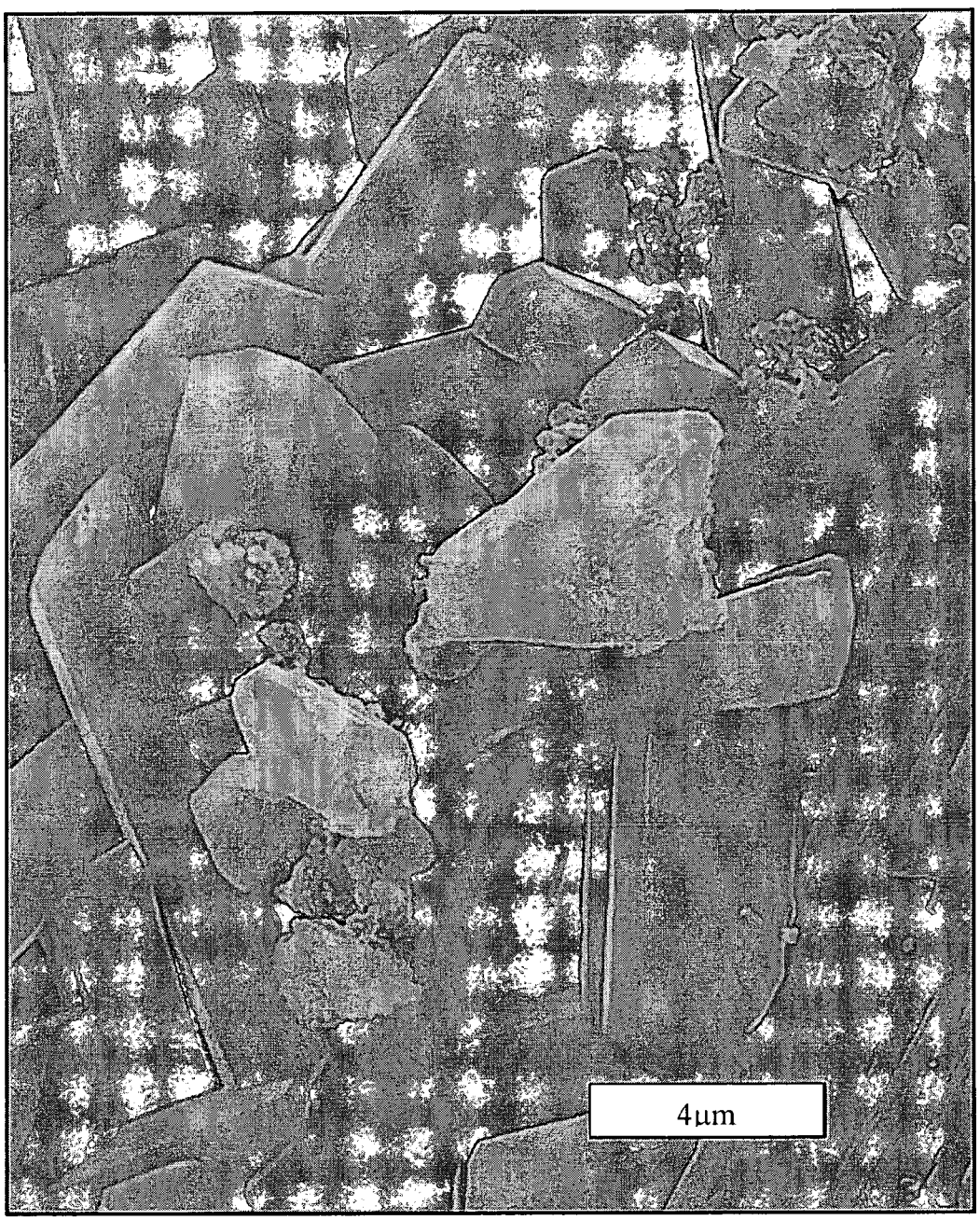
FIG. 11 is a photomicrograph of the embodiment of the composition of the invention shown in FIG. 8, showing a 4 μm scale.
Figure 12:
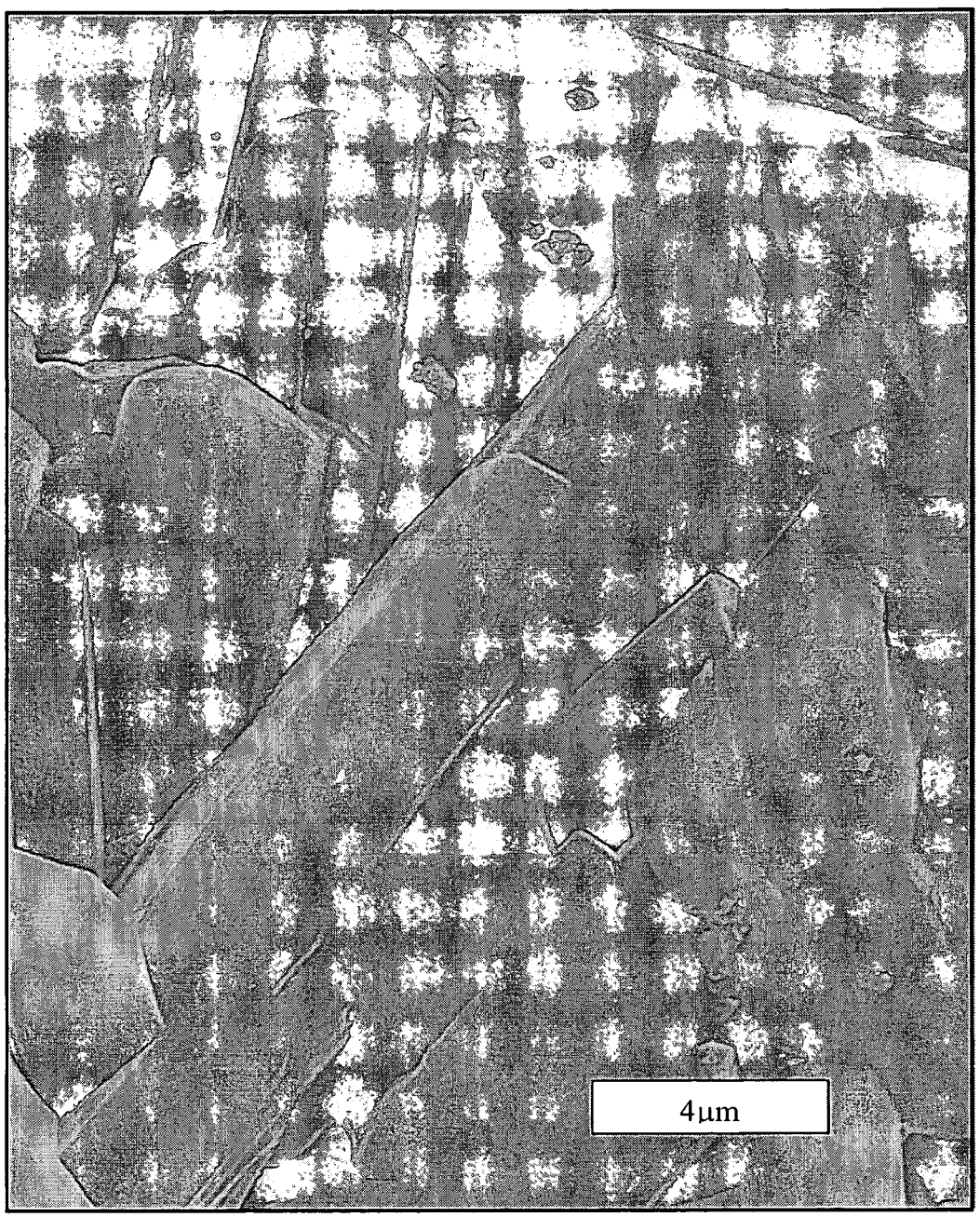
FIG. 12 is a photomicrograph of the embodiment of the composition of the invention shown in FIG. 5, also showing a 4 μm scale.
Figure 13:
FIG. 13 is a photomicrograph of a comparative composition shown in FIG. 3, also showing a 4 μm scale.
Figure 14:
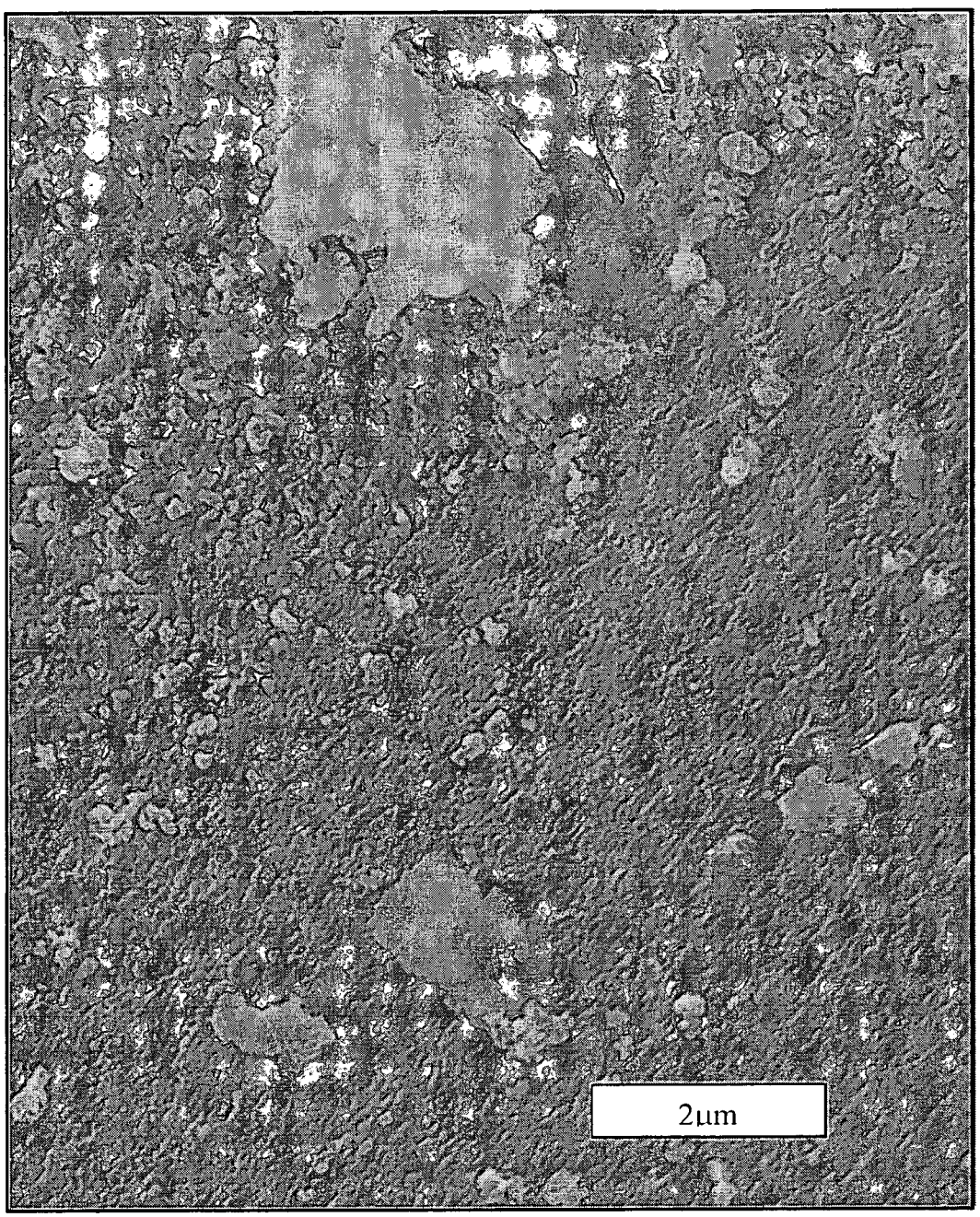
FIG. 14 is a photomicrograph of the embodiment of the composition of the invention shown in FIG. 1, showing a 2 μm scale.
Figure 15:
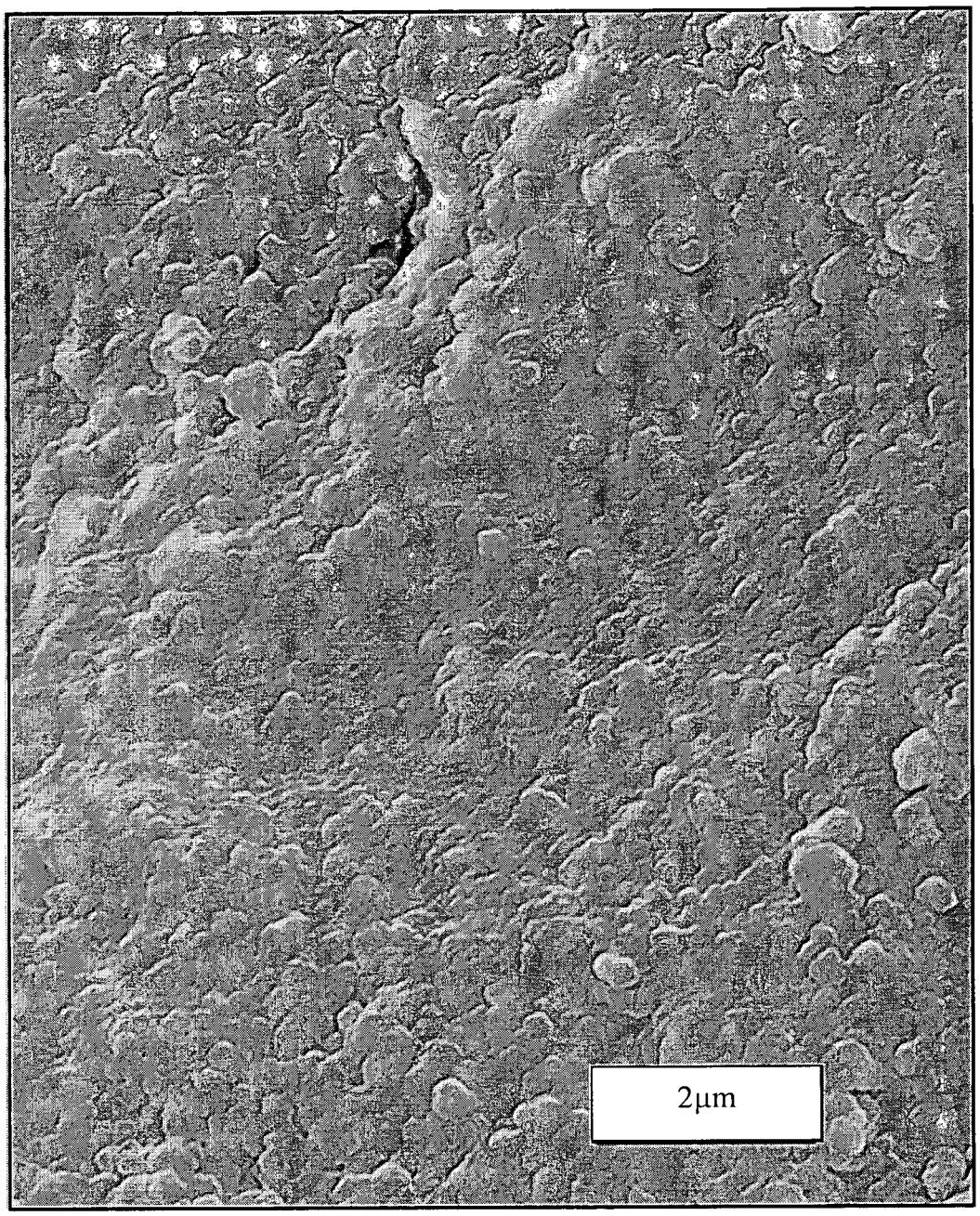
FIG. 15 is a photomicrograph of a comparative composition shown in FIG. 3, also showing a 2 μm scale.
Figure 16:
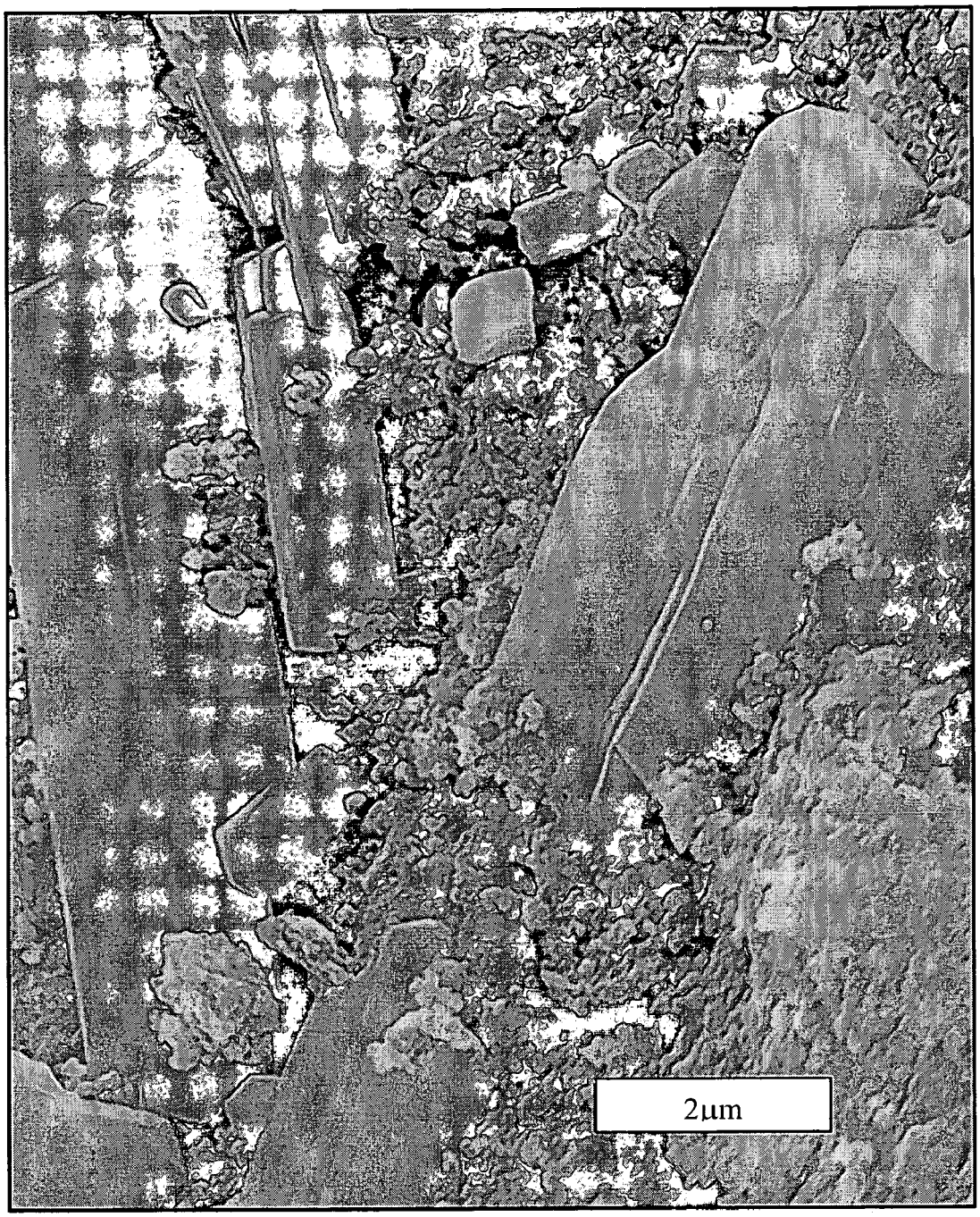
FIG. 16 is a photomicrograph of the embodiment of the composition of the invention shown in FIG. 8 also showing a 2 μm scale.
Figure 17:
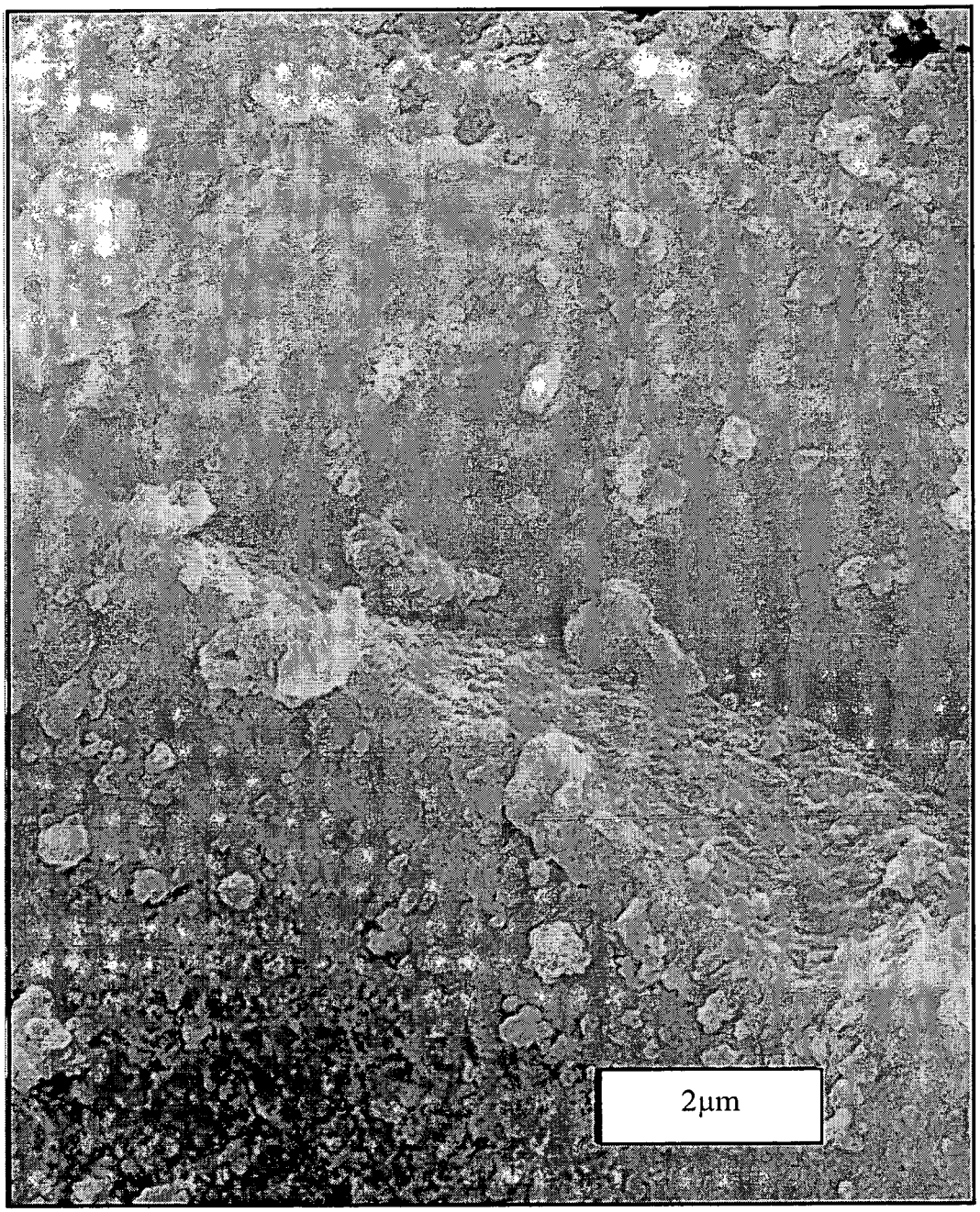
FIG. 17 is a photomicrograph of the embodiment of the composition of the invention shown in FIG. 2, also showing a 2 μm scale.
Figure 18:
FIG. 18 is a photomicrograph of a comparative composition, also showing a 2 μm scale.
Figure 19:
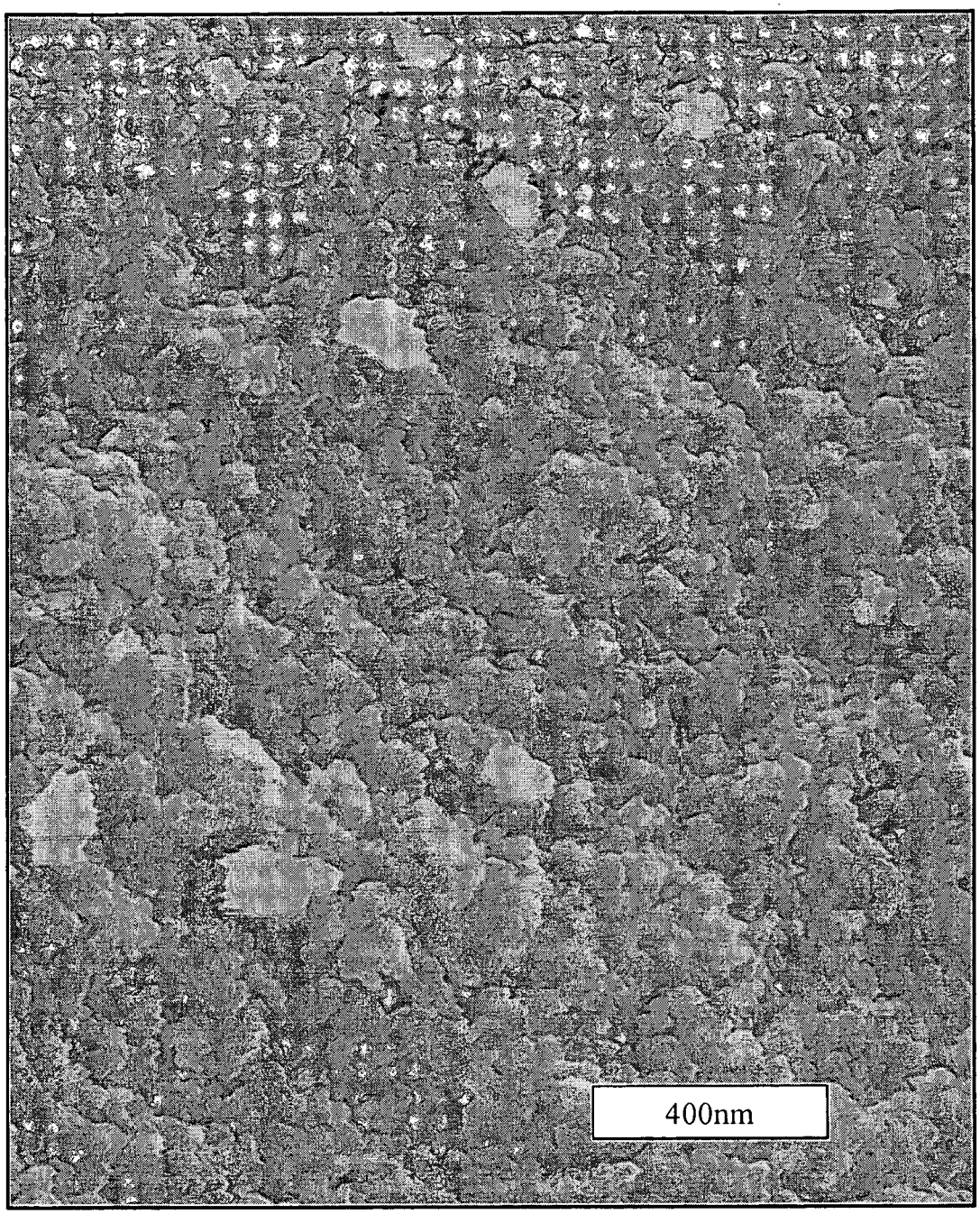
FIG. 19 is a photomicrograph of the embodiment of the composition of the invention shown in FIG. 1, showing a 400 nm scale.
Figure 20:
FIG. 20 is a photomicrograph of the embodiment of the composition of the invention shown in FIG. 8, also showing a 400 nm scale.

As described above, a specific embodiment of the invention relates to purification compositions containing nanoparticulate titanium dioxide and a synthetic aluminosilicate composition having pores in the size range of about 200 to about 300 angstroms.

The aluminosilicate can be produced by a method analogous to that described in U.S. Pat. No. 5,612,522, namely, by the formation of an aluminosilicate gel from slurried aluminum hydrate and alkali metal silicate in the presence of aqueous sodium hydroxide (e.g., by mixing with about 11% to about 14% of 50% concentration) in the presence of UV radiation (having a wavelength ranging from about 2000 to about 3900 angstroms). However, in addition to these components, it has been found that the addition of about 2% to about 8% by weight of nanotitanium dioxide having an average particle size in the range of about 1 to about 100 nm to the slurry results in a material that is extremely effective at removing organic materials from water.

Desirably, the titanium dioxide is added to the slurry prior to or during irradiation. This helps to bind the nanoparticulates to the resulting aluminosilicate more strongly. Curing time (time of exposure to UV radiation) will depend somewhat on the frequency and intensity of the UV source used, however generally ranges from about 5 days to about 14 days. Longer exposure times tend to increase the pore size for a given UV source and composition. Suitable nanoparticulate materials are those obtained as fumed metal oxides or hydroxides, having average diameters ranging from about 20 to about 100 nm. These particles are described in U.S. Ser. No. 09/854,010, filed May 11, 2001 and in U.S. Ser. No. 10/304,898, filed Nov. 26, 2002, the entire contents of each of which is incorporated herein by reference.

The resulting composition, which can contain from about 2% to about 8% by weight titanium dioxide and/or titanium hydroxide, and from about 90% to about 98% aluminosilicate, can then be washed, dried, and screened to the desired particle size distribution, which can have an average particle size ranging from about 1 to about 5 mm granules, or from about 1 to about 500 μm powder. It can be used as a granulate, a powder, or can be impregnated into a porous block using polymeric binder resins. It can be combined with other purification materials, such as activated carbon, zeolites, etc., thereby reducing the amounts of these materials necessary to achieve a desired level of decontamination or purification.

The composition of the invention can easily achieve a desirable average pore size of around 250 angstroms and a specific surface area of between about 200 and about 400 $m^2/g$, providing extremely high absorptive capacity and fast kinetics.

The composition of the invention can be used to remove organic materials from fluids, such as water and air, by simply placing the fluids in contact with the material for several minutes to several hours, depending on the temperature of the liquid during treatment and the amount of light present. Increasing the time of exposure increases the pore size of the material.

In addition to removing organic materials from fluids, the composition of the invention can also remove microorganisms from water.

The composition and method of the invention can be used to process and purify fluids in a continuous manner, e.g., as part of a filter element disposed in piping through which the fluid is caused to flow. Alternatively, the composition and method of the invention can be used to purify fluid in a batch or semibatch manner, such as by dispersing the composition in a body of fluid and later removing it by filtration, or by disposing the particle in a porous container, such as a basket or strainer, which can float or drift in the body of fluid, and is sufficiently porous to allow fluid to flow into and out of the container, but which effectively prevents most of the purification media from leaving the container.

As a result, the composition and method of the invention can be used to purify municipal drinking water by consumers, can be used by municipalities to purify their water supplies and to treat sewage, and can be used industrially to remove scum and microorganisms from cooling water, reduce organic effluents in waste water.

In addition, the composition of the invention can be used to purify water in swimming pools, spas, and the like. It has been found that the material of the invention, when suspended in a body of water, creates a zone around the material that extends through the water where microorganisms are killed or destroyed. Whether the mechanism for the creation of this zone involves simply diffusion/convection, or whether some flow of charged species is involved is not completely understood.

In addition to purifying water of organic materials and microorganisms, the material of the invention can also be used to purify air, e.g., by removing ethylene gas from storage rooms and refrigerators used to store cut flowers, produce and vegetables, and the like. Other gas purification uses include removing water or sulfur from natural gas, purifying polymeric and chemical processing feedstock and product streams, air filters in automobiles or other internal combustion engines, and the like. The invention media also reduces VOC from air very efficiently. The addition of UV light, halogen light or infrared light may improve its performance.

EXAMPLE 1

Preparation of Composition

Eight pounds alumina hydrate was added to approximately 1 gallon sodium hydroxide, 50% solution. It was cooked 0.5 hour at 120-300° F., average 150° until the alumina hydrate was dissolved. The slurry was mixed with sodium silicate containing 4% titanium dioxide having an average particle size of 20-100 nm. The volume of sodium silicate mixed was 5.75 gallons, then mixed for 60 seconds at 600 rpm, and put on a curing bed and exposed to UV light for 5 to 7 days. The resulting material was placed in a ceramic tray and heated to 500° C. for 7 hours.

Sample particles of the resulting composition were imaged using scanning electron microscopy (SEM) to illustrate surface topography of the material. Photomicrographs of this material are provided in FIGS. 1, 4, 9, 14, and 19.

Figure 21:
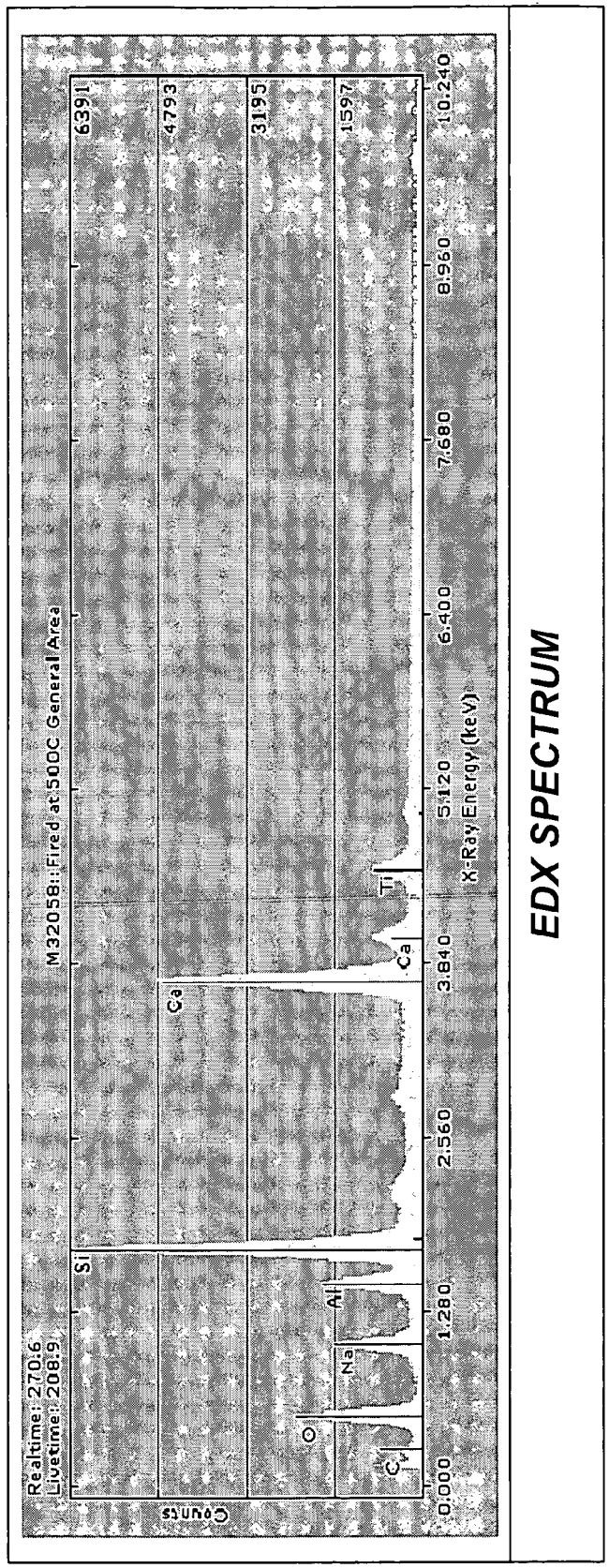
FIG. 21 is a graph showing results of energy dispersive x-ray analysis of the embodiment of the invention shown in FIG. 1.

Energy dispersive x-ray spectroscopy (EDX) was performed on this material, and the results presented in FIG. 21. The absence of a strong peak for titanium, together with the absence of titanium particles readily observable by backscattered electron imaging (BSE) indicated that the titanium oxides are atomically distributed or are present in the form of particles less than about 0.1 μm in diameter.

EXAMPLE 2

Preparation of Composition

The process described above in Example 1 was followed, except that the material was not heated to 500° C.

Sample particles of the resulting composition were imaged using SEM to illustrate surface topography of the material. Photomicrographs of this material are provided in FIGS. 2, 5, 7, 8, 11, 12, 16, 17, and 20.

Figure 22:
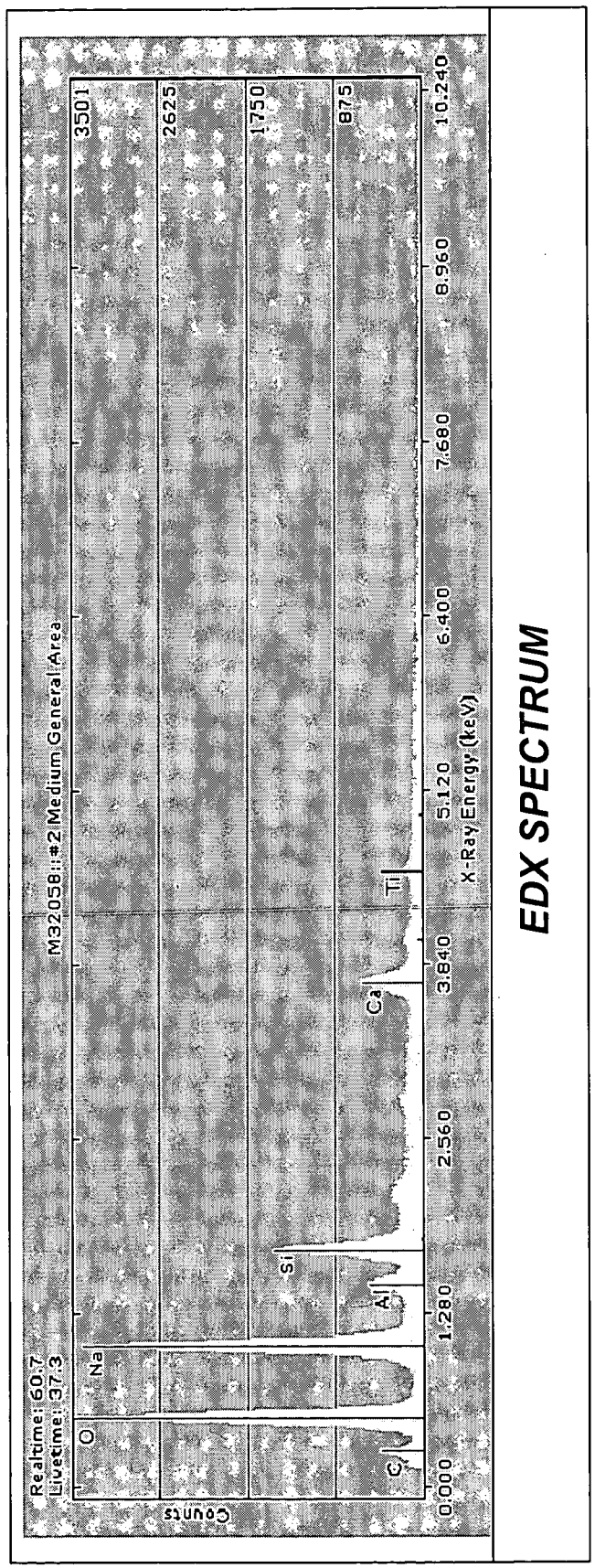
FIG. 22 is a graph showing results of energy dispersive x-ray analysis of the embodiment of the invention shown in FIG. 5.
Figure 23:
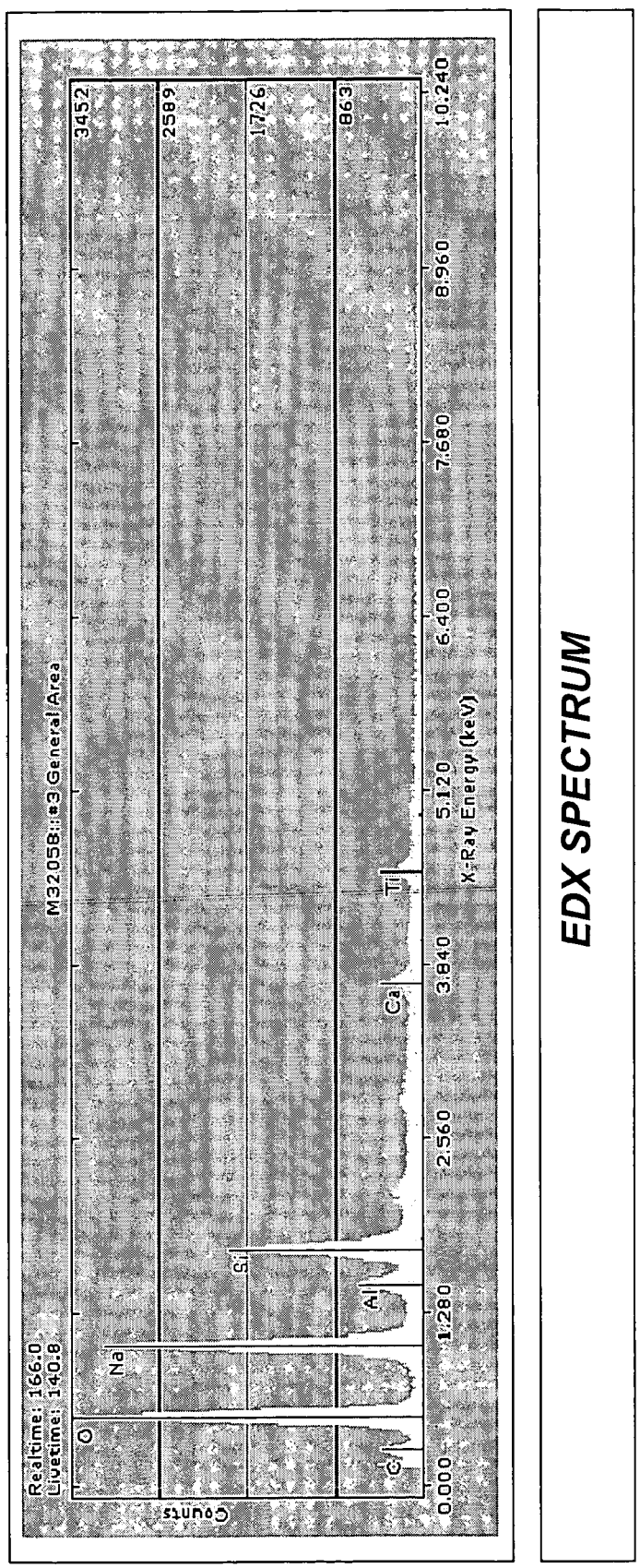
FIG. 23 is a graph showing results of energy dispersive x-ray analysis of the embodiment of the invention shown in FIG. 8.

EDX was performed on samples of this material, and the results presented in FIG. 22 and FIG. 23. Conclusions similar to those described in Example 1 can be drawn with respect to the material of Example 2.

COMPARATIVE EXAMPLE 1

Preparation of Comparative Material

The procedure described above in Example 1 was carried out, except that no titanium dioxide nanoparticles were added to the material.

Sample particles of the resulting composition were imaged using SEM to illustrate surface topography of the material. Photomicrographs of this material are provided in FIGS. 3, 6, 10, 13, 15, and 18. The material was placed in an aqueous solution of about 1000 ppm Aldrich Crystal Violet 548-62-9 dye, in light, but did not result in any appreciable reduction in dye concentration.

The material of the invention can be used as obtained from its production process, or can be modified by grinding to any desired particle size distribution. Additionally, heating of the material to a temperature above about 500° C. (as described in Example 1) for several hours can increase its activity, resulting in faster removal of organic material. In general, good results have been obtained by limiting the temperature of exposure from 350-600° C.

EXAMPLE 3

Organic Material Reduction 2.5 g of the material of Example 1 was added to a beaker, and 100 ml deionized water was added to the material. 0.8 ml of violet dye Aldrich Crystal Violet, 548-62-9, which corresponds to about 800 ppm of organic impurity, was added to the water, and left in fluorescent light at room temperature. After 0.1 hours, no purple dye was visible in the water.

EXAMPLE 4

Organic Material Reduction 2.5 g of the material of Example 2 was added to a beaker, and 100 ml Atlanta city water with the material. 1.5 ml of violet dye Aldrich Crystal Violet, 548-62-9, which corresponds to about 1500 ppm of organic impurity was added to the water, and left in sunlight at room temperature. After 1 hour, no purple dye was visible in the water.

EXAMPLE 5

Organic Material Reduction 1 g of the material of Example 1 was added to a beaker, and 100 ml deionized water was mixed with the material, which was allowed a few minutes to settle. 1 ml of violet dye Aldrich Crystal Violet, 548-62-9, which corresponds to about 1000 ppm of organic impurity was added to the water, stirred, and left in a darkened room at room temperature. After 24 hours, purple dye was still visible in the water. Approximate reduction was 90%.

EXAMPLE 6

Organic Material Reduction 100 g of the material of Example 1 was added to a beaker, and 1000 ml municipal water and was allowed a few minutes to settle. 2 ml of violet dye Aldrich Crystal Violet, 548-62-9, at 2% concentration, which corresponds to about 2,000 ppm of organic impurity was added to the water, and left approximately 60 in. from a 1 V UV light at room temperature. After 1 hour, no purple dye was visible in the water.

EXAMPLE 7

Microbicidal Activity 10 g of the material of Example 1 was added to a beaker, and 500 ml deionized water was mixed with the material, which was allowed a few minutes to settle. 65,000 CFU of $E.\ coli$ were added to the water, stirred, and left in sunlight. After 1 hour, $E.\ coli$ content was assessed and found to have undergone a 99.9999% reduction.

COMPARATIVE EXAMPLE 2

Organic Material Reduction Testing 96 g of PQ zeolite Y was mixed with 10 g titanium dioxide 1 to 50 micron, and was bonded with water glass through a spray dry process, in a 500 mL beaker, and added 1,000 ppm violet dye, and exposed to UV light. After 24 hours, no sign of violet dye reduction. After 48 hours, a slight reduction occurred. After 7 days, there was 60% reduction, and after 14 days, 90% reduction.

COMPARATIVE EXAMPLE 3

Organic Material Reduction Testing

Engelhard ATS titanium silicate, 20 to 40 microns, 5 g, was added to 1,000 cc deionized water with 1,000 ppm violet dye and exposed to UV light. At 6 hours, reduction of the violet dye was less than 20%. At 48 hours, about 40% reduction was observed; after 7 days, about 90% reduction was observed. The experiment was repeated, but no reduction at all was found, indicating that the Engelhard ATS absorbed the dye, but did not decompose the dye in the zeolite.

EXAMPLE 8

Algae Reduction 150 g of the composition of Example 1 was put in a porous basket 10" in diameter and 2" thick, and floated in a spa of approximately 300 gallons with and average 25,000 ct to 150,000 ct algae spores. When exposed to sun, there was 50% reduction of the algae in the water within the first 48 hours. Within 72 hours, no algae was detected in the spa. Turbidity of the spa water went down from 7 NTU to 0.2 NTU in less than 48 hours.

EXAMPLE 9

Algae Reduction 5 g of the material produced in Example 1 were added to 1000 cc water containing 800,000 cells/mL of an algae and exposed to sunlight for 24 hours. The algae was completely destroyed by the end of this time period.

COMPARATIVE EXAMPLE 4

A composition was made with 50% titanium dioxide and 50% titanium hydroxide 1 to 50 micron, obtained as pigment commonly used in the paint industry. The titanium was added to sodium silicate, aluminum hydrate, and sodium hydroxide as described in Example 1, and exposed to UV light, also as described in Example 1. The curing of the aluminosilicate was very poor and crystal formations were unable to grow in the presence of the titanium dioxide. The final product was like a brick, non-porous, and very hard. 10 g of the material was placed in 100 ml of water and 1,000 ppm violet dye added. After 48 hours no reduction of organic material was observed, with or without UV light. This example illustrates the importance of using nanoparticulate titanium dioxide or hydroxide.

EXAMPLE 10

Chloroform Reduction 1,000 gallons of municipal water was injected with 13,600 ppb chloroform and was placed in a plastic tank without circulation and with an open top exposed to the sun. 1 lb. of the composition of Example 1 was enclosed in a 4" diameter plastic screen floating in the water about 10" from the water surface. Chloroform reduction after the first 24 hours was approximately 75%; after 48 hours it was approximately 99%.

EXAMPLE 11

500 gallons municipal water was contaminated with approximately 260 ppb chloroform and placed in an open top plastic tank. 200 g of the composition of Example 1 were placed near the bottom of the tank, approximately 2' below the surface of the water, in a 1" thick and 8" diameter plastic basket having a screen size of approximately 50 mesh. The plastic basket was secured to the bottom of the tank. The water was exposed to UV light, and chloroform reduction for the first 8 hours was 40%; after 24 hours, 92%; and after 72 hours, the chloroform was non-detectable.

EXAMPLE 12

500 gallons municipal water was contaminated with approximately 400 ppm phenol, and placed into the experimental set up described in Example 11. 10 lbs of the composition of Example 1 was introduced in the basket. After exposure to the sun for 2 days there was 90% reduction of phenol, and after 3 days, phenol was non-detectable.

These experiments provide evidence that the nanotitanium aluminosilicate of the invention, particularly when exposed to UV radiation, decomposes phenol very effectively.

What is claimed is:

1. A purification material comprising:
   an aluminosilicate having average pore diameters ranging between about 100 angstroms and about 300 angstroms;
   one or more fumed transition metal oxides, metal hydroxides, or combination thereof, either distributed on or in the aluminosilicate, or associated with the aluminosilicate as particles having an average diameter between about 20 and about 100 nm.

2. The purification material of claim 1, wherein the transition metal oxide or hydroxide comprises a titanium oxide.

3. The purification material of claim 2, wherein the fumed titanium oxide comprises fumed titanium dioxide.

4. The purification material of claim 1, wherein the aluminosilicate contains at least one amorphous region.

5. A method for making the purification material of claim 1, comprising:
   mixing aluminum hydrate, alkali metal silicate, sodium hydroxide, and fumed transition metal oxide in water; and
   irradiating the resulting mixture with UV radiation of wavelength ranging from about 2000 to about 3900 angstroms for at least 1 hour.

6. The method of claim 5, wherein the transition metal oxide is added in an amount ranging from 2 wt % to about 10 wt %, based on the weight of the resulting aluminosilicate in the composition.

7. The method of claim 5, wherein the transition fumed metal oxide is fumed titanium dioxide.

8. The method of claim 7, wherein the irradiation occurs over a period of about 5 to 14 days.

9. The method of claim 5, further comprising heating the irradiated material to a temperature at or above 350-600° C. for at least 1 hour.

10. The method of claim 9, wherein the heating occurs for a period of around 8 hours.

11. A method for removing contaminants from a fluid, comprising contacting the fluid with the purification material of claim 1 for a sufficient time to reduce the concentration of at least one contaminant in the fluid.

12. The method of claim 11, wherein the contaminants comprise volatile organic compounds.

13. The method of claim 12, wherein the volatile organic compounds comprise halocarbon compounds.

14. The method of claim 12, wherein the volatile organic compounds comprise ethylene.

15. The method of claim 11, wherein the fluid comprises water or aqueous solution.

16. The method of claim 11, wherein the contaminants comprise microorganisms.

17. The method of claim 16, wherein the microorganisms comprise bacteria.

18. The method of claim 17, wherein the bacteria comprise *E. coli*.

19. The method of claim 16, wherein the microorganisms comprise virii.

20. The method of claim 19, wherein the virii comprise polio or MS 2.

21. The method of claim 11, wherein the microorganism comprises algae.

22. The method of claim 11, wherein the contacting comprises floating the composition in water for a period of time sufficient to reduce the level of one or more contaminants.

23. The method of claim 11, wherein the fluid is selected from the group consisting of municipal or drinking water supplies, swimming pools, spas, and cooling tower water.

24. A method of purifying air by contacting the air with the composition of claim 1 for a time sufficient to reduce the concentration of volatile organic compounds in the air.

25. The method of claim 24, further comprising exposing the air to UV light during the contacting.

26. The method of claim 24, further comprising exposing the air to infrared light during the contacting.

27. The method of claim 24, further comprising exposing the air to halogen light during the contacting.

28. The method of claim 24, wherein the composition is in the form of granular material of particle size 20×80 mesh.

29. The method of claim 24, wherein the composition is in the form of a non-woven material impregnated with particles having size ranging from 1-100 micron.

* * * * *